N. W. McLEOD & M. A. DEES.
MOLD FOR PNEUMATIC TIRES.
APPLICATION FILED MAY 8, 1911. RENEWED FEB. 19, 1913.
1,114,280.
Patented Oct. 20, 1914.
2 SHEETS—SHEET 1.
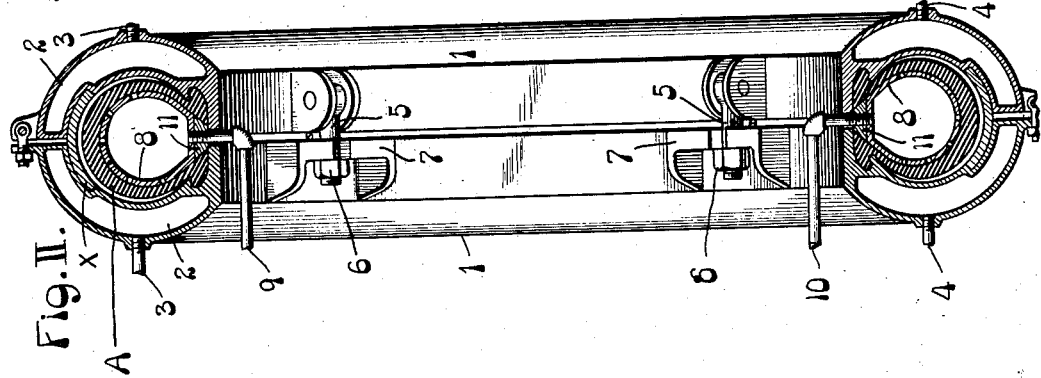
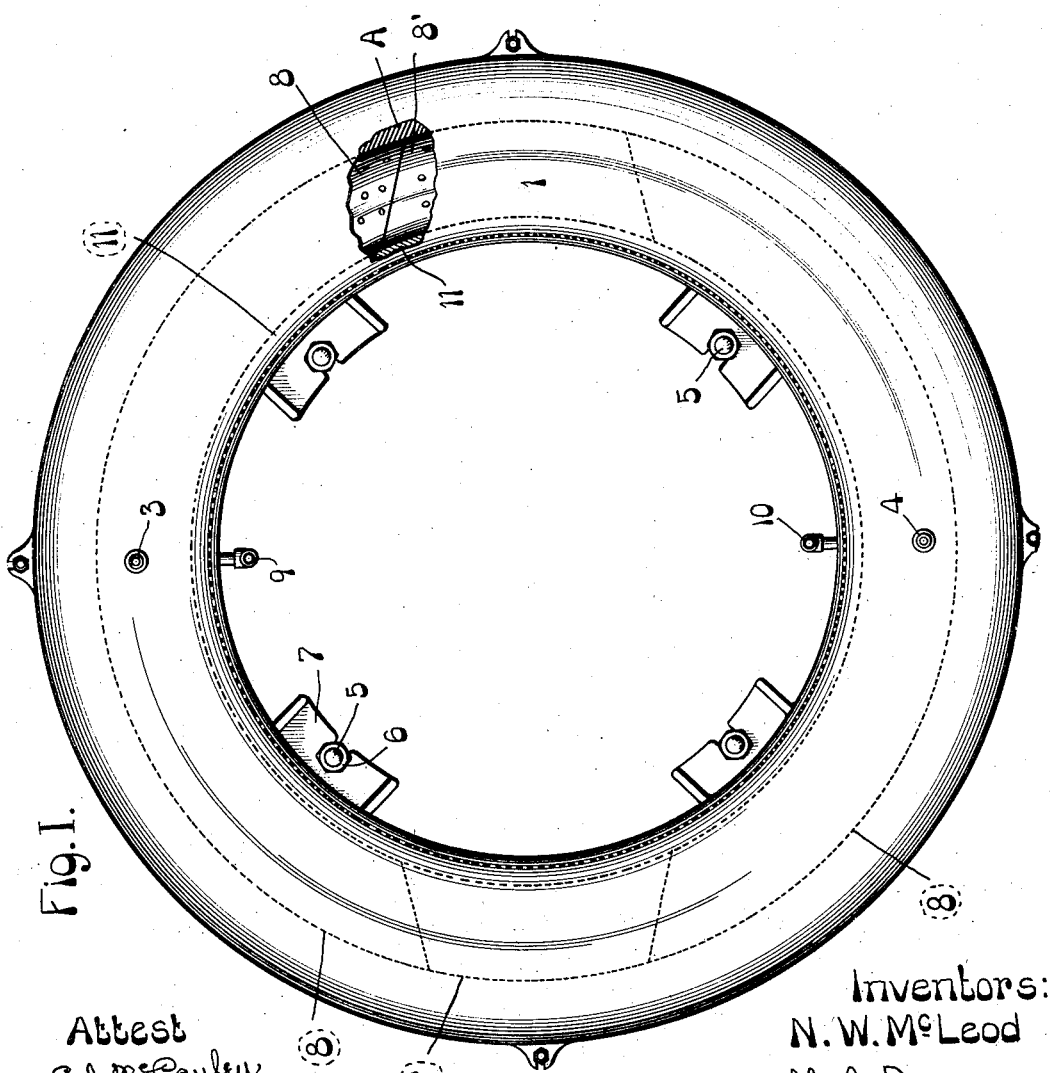
Attest
a. J. McCauley
E. B. [illegible]
Inventors:
N. W. McLeod
M. A. Dees
by Knight Hook Attys.

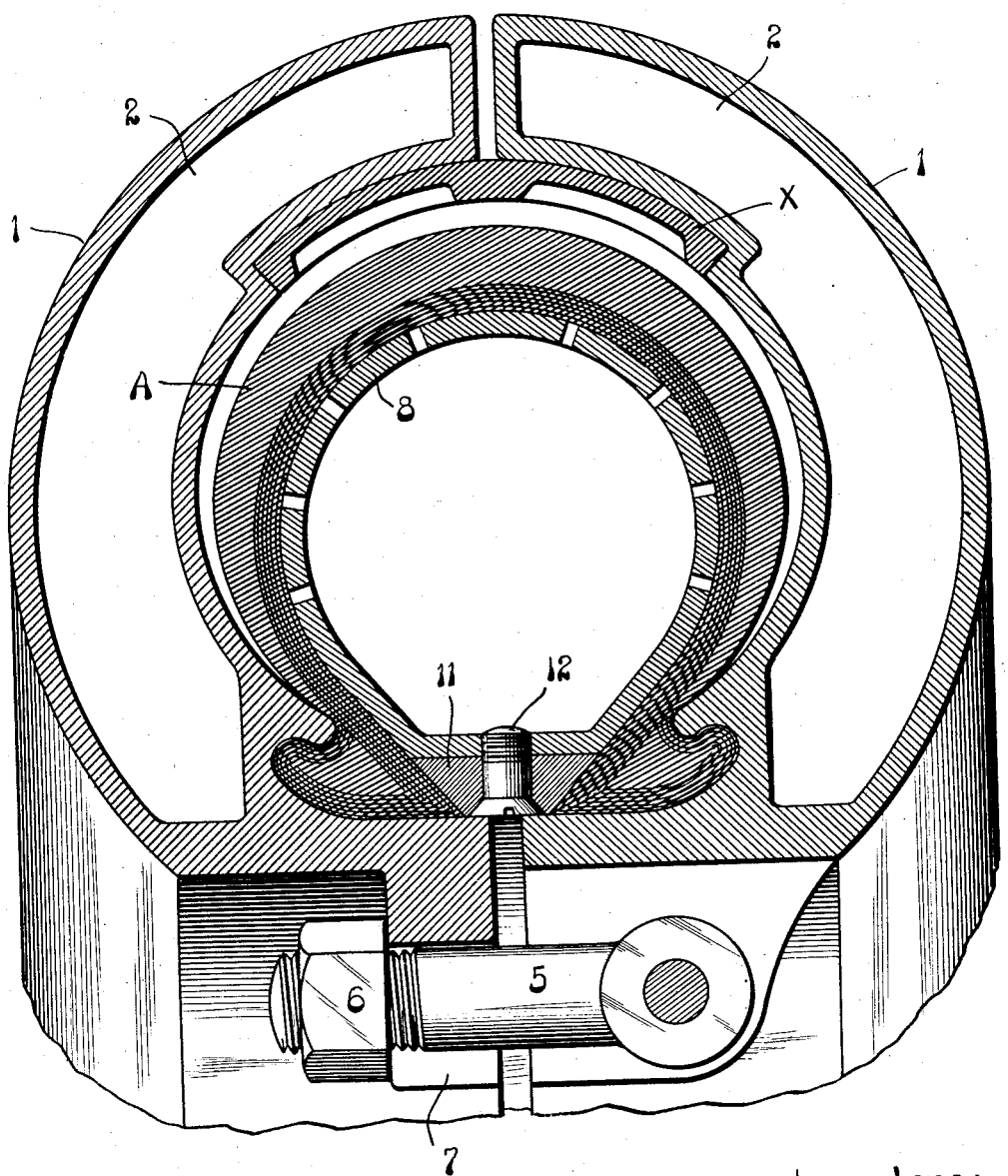

UNITED STATES PATENT OFFICE.

NELSON W. McLEOD, OF ST. LOUIS, MISSOURI, AND MARK A. DEES, OF PASCAGOULA, MISSISSIPPI, ASSIGNORS TO AMERICAN TIRE COMPANY, OF ST. LOUIS, MISSOURI, A CORPORATION OF MISSOURI.

MOLD FOR PNEUMATIC TIRES.

1,114,280.        Specification of Letters Patent.        Patented Oct. 20, 1914.

Application filed May 8, 1911, Serial No. 625,784. Renewed February 19, 1913. Serial No. 749,531.

*To all whom it may concern:*

Be it known that we, NELSON W. MCLEOD and MARK A. DEES, citizens of the United States of America, residing in the city of St. Louis and State of Missouri and in Pascagoula, in the county of Jackson and State of Mississippi, respectively, have invented certain new and useful Improvements in Molds for Pneumatic Tires, of which the following is a full, clear, and exact description, reference being had to the accompanying drawings, forming part of this specification.

Our invention relates to a mold for use in the manufacture of the outer casings of pneumatic tires and in which the casings are treated for the purpose of vulcanizing them, due to the carrying out of what is commonly known as a cooking or curing process, occasioned by the subjection of the casings to steam or other heating medium.

The object of our invention is to produce a tire molding device by which pneumatic tire casings may be expanded during the molding or cooking process and before the elements of the casings have become set by the cooking process and whereby the imperfections previously present in the casings are avoided and the casings are produced in a normal condition that corresponds to their normal condition when they are in service.

Figure I is a side elevation of our mold, partly broken out, to expose the core therein. Fig. II is a cross section through the mold. Fig. III is an enlarged cross section through the mold.

In the accompanying drawings: 1 designates the outer or shell sections of our mold. These sections are in the form of hollow rings, each section being of segmental shape in cross section. Each section 1 has a concave inner wall corresponding to a cross sectional segment of a pneumatic tire casing, preferably including the usual beads at the inner edges of such a tire casing. Each outer mold section contains one or more chambers 2 into which a heating medium, such as steam, may be delivered, the heating medium being preferably admitted to the chambers through delivery pipes 3 and discharged through outlet pipes 4. The shell sections are designed to be drawn toward each other to confine the parts within them, to be hereinafter particularly mentioned, by any suitable means; such, for instance, as the draw bolts 5 pivoted to one of the shell sections and provided with nuts 6 that engage slotted lugs 7 on the other shell section, the nuts being operable to cause desired approach of the shell sections toward each other. The draw members just mentioned are located both at the inner and outer circles of the mold sections, as seen in the drawings.

Centrally arranged within the shell sections is a core comprising a plurality of hollow sections 8 and 8′ which, when placed with their ends in abutment against each other, produce a hollow circular core corresponding in shape to the shape of the interior of a pneumatic tire casing, with the exception of that portion of the casing immediately adjacent the edges at the inner circle of the casing. This core is made of sections to permit of its being readily arranged within the tire casing A and readily withdrawn from such casing after the casing has been molded, and the ends of the core sections are preferably beveled, as seen in Fig. I, so that when the sections are assembled, they will fit closely against each other to produce the circular shape of the core and effect comparatively close joints between the core sections. The core sections are perforated, as shown in the drawings, to permit the heating medium being delivered into the core passing therethrough and to the surrounding tire casing, with the object in view of expanding the casing between the core and the inner faces of the shell sections 1. In this connection, it should be stated that the core and the inner faces of the shell sections are spaced apart, relative to each other, to a degree greater than the cross section of the tire casing that is to be molded, thereby making it possible for the tire casing to be expanded or stretched outwardly from the core, when it is acted upon by the pressure of heating medium as it passes through the perforated core. The admission and discharge of heating medium to and from the core of the mold is provided for by pipes 9 and 10.

At the inner circle of the core is an endless packing ring 11 held to the core sections by screws 12. The packing ring seats between the inner edges of the tire casing A and is tightly clamped thereto when the shell sections are drawn together to confine the tire casing in the mold. This packing ring is preferably made with sloping sides corresponding to the shape of the inner faces of the tire casing adjacent its edges, and when it is tightly clamped between the inner edges of the tire casing by the closure of the mold, it effectually prevents any escape of heating medium between the core and the inner edges of the tire casing. It therefore confines the heating medium in the casing so that it will accomplish its intended function of expanding the casing to remove imperfections that would otherwise be present therein, and also at the same time perform what is commonly known as the cooking of the tire casing.

We preferably provide within the shell of our mold a tread forming member X removably mounted between the mold sections 1 and overlapping the outer edges of said sections. This tread forming member may have an inner surface of any desired contour and may be provided at its inner surface with recesses or protuberances for the purpose of producing either protuberances upon or recesses in the tread of the tire casing produced in the mold.

We claim:

1. A tire mold comprising a sectional shell within which the tire having separable edges is housed and a hollow circular core within said shell, the said core comprising a plurality of curved hollow sections, the said core sections having open ends abutting against and in continuous communication with each other throughout the core, and means for conducting a fluid pressure heating medium into the core at its inner circle, the wall of the core being perforated and the core being imperforate at its inner circle aside from the fluid conducting means.

2. A tire mold comprising a sectional shell within which the tire having separable edges is housed and a hollow circular core within said shell, the said core comprising a plurality of curved hollow sections, the said core sections having open ends abutting against and in continuous communication with each other throughout the core, means for conducting a fluid pressure heating medium into the core at its inner circle, the wall of the core being perforated and the core being imperforate at its inner circle aside from the fluid conducting means, and said core being provided at its inner circle with a packing adapted to seat between the separable edges of the tire.

3. A tire mold comprising a sectional shell within which the tire having separable edges is housed and a hollow circular core within said shell, the said core comprising a plurality of curved hollow sections perforated at the periphery and sides of the core, the said core sections having open ends abutting against and in continuous communication with each other throughout the core, means for conducting a fluid pressure heating medium into the core at its inner circle, the core being imperforate at its inner circle aside from the fluid conducting means, and a packing ring connecting said core sections at the inner circle of the core.

4. A tire mold composed of a pair of hollow mold sections adapted to surround the tire, a packing ring adapted to be held between the inner edges of a tire confined by said mold sections, hollow core sections provided with perforations and arranged between said mold sections with their ends abutting against each other to produce a hollow circular core, means for connecting said hollow core sections to said packing ring, the ends of said core sections being open to allow fluid to pass from one section to another, and means for introducing a fluid pressure and heating medium into the hollow core formed by said hollow perforated sections.

5. A tire mold comprising a shell composed of a pair of hollow mold sections each having a concave inner wall adapted to engage the exterior of the tire, means for introducing a heating medium into each of said shell sections, a tread forming member removably mounted between said sections, a packing ring adapted to be held between the inner edges of a tire confined by said shell sections, a plurality of curved hollow sections provided with perforations and arranged between the shell sections with their ends abutting against each other to produce a hollow circular core, means for connecting the last mentioned sections to said packing ring, and means for introducing a fluid pressure and heating medium into said hollow circular core.

N. W. McLEOD.
M. A. DEES.

In the presence of—
E. B. Linn,
A. J. McCauley.